United States Patent [19]

Somers

[11] 4,076,065
[45] Feb. 28, 1978

[54] TIRE STUD WITH ANTI-SKID SURFACE

[76] Inventor: Jay G. Somers, 1706 Chestnut St., Oshkosh, Wis. 54901

[21] Appl. No.: 635,495

[22] Filed: Nov. 26, 1975

Related U.S. Application Data

[63] Continuation of Ser. No. 521,166, Nov. 5, 1974, abandoned.

[51] Int. Cl.² .............................................. B60C 11/16
[52] U.S. Cl. .................................... 152/210; 152/168; 152/212
[58] Field of Search .............................. 152/210–212, 152/162, 167, 168, 208

[56] References Cited

U.S. PATENT DOCUMENTS

| 1,082,096 | 12/1913 | Pratt | 152/212 |
| 1,864,939 | 6/1932 | Respress | 152/212 |
| 3,003,534 | 10/1961 | Cousins | 152/211 |
| 3,126,041 | 3/1964 | Williams | 152/212 |
| 3,167,280 | 1/1965 | Stokes | 152/211 |
| 3,865,167 | 2/1975 | Gebert | 152/212 |

Primary Examiner—Drayton E. Hoffman
Assistant Examiner—Donald W. Underwood
Attorney, Agent, or Firm—Francis J. Bouda

[57] ABSTRACT

An anti-skid stud which comprises a plug or matrix in which are embedded one or more wire-like strands of great wear resistance material such as iron, steel, siliceous material, plastics, etc., which protrude from the matrix. The stud is installed in the surface of tires with the wire-like strands protruding to the road surface. These protrusions penetrate ice and snow surfaces to provide anti-skid traction, however on surfaces such as bare concrete these protrusions flex and do not penetrate the surface to cause excessive erosion of the concrete surface.

2 Claims, 6 Drawing Figures

TIRE STUD WITH ANTI-SKID SURFACE

This is a continuation of application Ser. No. 521,166 filed Nov. 5, 1974.

BACKGROUND OF THE INVENTION

This invention relates to a tire stud having metal wire embedded in a matrix so that the assembly can be affixed to the perimeter of a tire to provide anti-skid properties to the surface of the tire.

Tire studs using metal spikes are a well known anti-skid device used in rubber tires, as shown in U.S. Pat. Nos. 3,464,476, 3,476,166, 3,719,478 and 3,818,966, and they have been used widely because of the tremendously improved traction they provide on snow and ice surfaces. Use of the studs has allowed automobile travel during snow and ice conditions considered to be extreme. Also the safety of traveling has been increased with resultant decrease in accidents and property damage. These advantages have been overshadowed, though, by the extreme wear the metal spike studs have caused to the road surfaces. The use of these studs is restricted and is even outlawed in some areas because of damage to expressways, tollways, interstate highways, regular streets and roads by the spikes.

The use of wire for anti-skid devices on tires has been proven successful. The wire is inserted in the tire during the manufacture of the tire in the form of coils, U-shapes, twisted wires, mesh, etc., as shown in U.S. Pat. Nos. 2,720,906, 2,777,498, 3,003,534 and 3,053,031. There are advantages and disadvantages in these various methods, the biggest disadvantage being that these tires are a single purpose tire, they are made to be used during periods requiring anti-skid tires. Tires that are made for the addition of studs can be used with or without studs and the manufacture and inventory of tires are simplified and minimized because the tire is not made anti-skid until the ultimate user buys it.

My tire stud which has protruding metal wire embedded in a matrix provides a stud with a relatively flexible tip. The wire which provides the anti-skid properties protrudes into snow and ice to provide traction on these slippery surfaces, but when the tire rolls on the concrete the wire bends with the tire tread and does not penetrate the concrete surface. A single rigid stud such as presently used penetrates the concrete surface because it does not retract into the tire far enough to eliminate its pointed contact with the concrete. This prior stud also is so wear resistant it does not wear down as fast as the tire tread and this results in a still greater protrusion of the stud from the tire with more damage to the concrete surface.

Individually applicable studs made with wires embedded in a matrix provide further advantages in addition to the previously stated advantages in that they can be installed with currently known stud tools into currently known tires; the stud does not build up internal heat or allow entrance of gritty contaminants next to the stud or other such problems that occur when using rigid studs which damage the portion of the tire adjacent to the stud so that the grip of the stud by the tire is weakened and there is possible expulsion of the stud from the tire. My stud is inexpensive to make relative to spike studs in that it can be made by a continuous process which extrudes the matrix around the wires, then cutting the extruded assembly into lengths and forming the stud by shaping the cut length in a suitable forming die. The stud can also be made by injecting the matrix material around a pre-shaped wire assembly such as in injection molding, casting or pouring techniques.

The major object of this invention is to provide a new tire stud which is anti-skid and which will eliminate the problems of extreme road wear.

Another object of this invention is to use wire in the form of a stud to provide anti-skid properties for tires.

Another object of this invention is to embed the wire in a matrix of plastic material to hold the wires in place and to form the stud. This construction has advantages of conforming to the tire and of long life because the heat which is created in the wire during periods of vehicle acceleration or braking does not overheat the tire. The stud works with the tire and generates minimum heat and the plastic does not allow the heat to deteriorate the rubber of the tire around the stud hole.

Another object of this invention is to form a stud wherein the wire is embedded in a matrix of rubber, rubber-like material or so-called plastic resins, any or all of which materials may be resilient or rigid as a means of forming the stud to hold the wires in place.

Another object of this invention is to form a stud wherein the bundle of wires is held together by a tie around the bundles as well as by a matrix material.

Another object of this invention is to form a stud wherein the wire is embedded in a matrix of metal which is faster wearing than the wire, to hold the wire in place and to form the stud, for end uses that require full rigidity of the stud.

DESCRIPTION OF THE DRAWINGS

In FIGS. 1 and 2 a stud 9 has the wire 10 embedded in the matrix 11, 12 being the vertical matrix member and 13 being the base matrix member. The tips 14 of the wire 10 extend beyond the end 15 of vertical matrix member 12. The wire at 10a is curved from the vertical member 12 into the base member 13 as a means of retaining the wire 10 in the stud 9. The curve at 10a is formed at the time of forming the base 13. The matrix 11 when made with thermoplastic material can be extruded continuously over the wire 10 after which the matrix coated wire is cut into appropriate lengths for studs. These lengths are then placed into forming dies which shape and form the base 13. The matrix 11 can be made of various materials such as plastic, resins, rubber, synthetic rubber, metals, etc. The base can be formed in a die either by reshaping a previously formed matrix and wire or by forming the vertical 12 and base 13 matrices at the same time of incorporating the wire in the matrix such as in a plastic or rubber molding or forming process or in a metal forming, stamping or casting process.

In FIGS. 3 and 4 a stud 19 has a wire 20 embedded in the matrix 21, 22 being the vertical matrix member and 23 being the base matrix member.

Wire 20 is held in place by cross-member 24 which is embedded in the base matrix 23. Wire 20 is preformed into a U-shape with cross-member 24 fitting into the U to retain the wire 20 in the stud 19.

Figure 1:
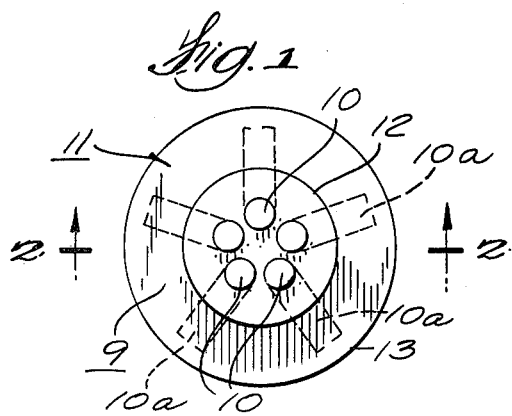
FIG. 1 is a plan view of one embodiment of the stud looking at the anti-skid end which protrudes from the tire surface.
Figure 3:
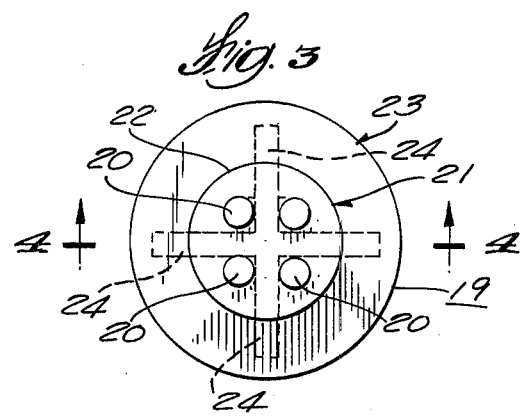
FIG. 3 is a plan view of another embodiment of the stud looking at the anti-skid end which protrudes from the tire surface.
Figure 2:
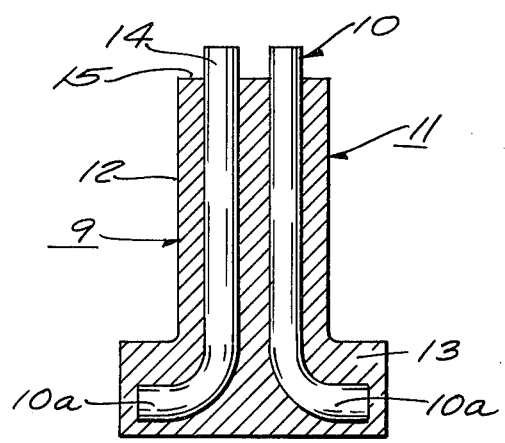
FIG. 2 is a cross-sectional view of the stud taken along Section 2—2 of FIG. 1.
Figure 4:
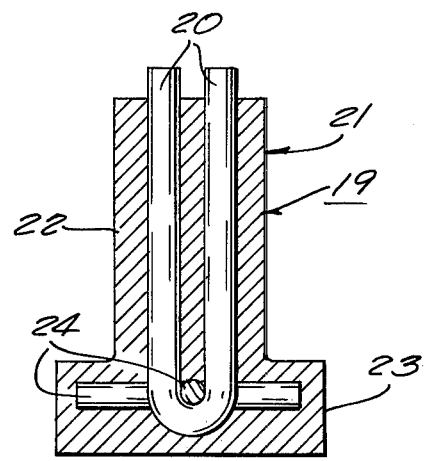
FIG. 4 is a cross-sectional view of the stud of FIG. 3 taken along Section 4—4 of FIG. 3.

FIGS. 2 and 4 exhibit two variations of the method of affixing the anti-skid wires into the matrix.

Figure 5:
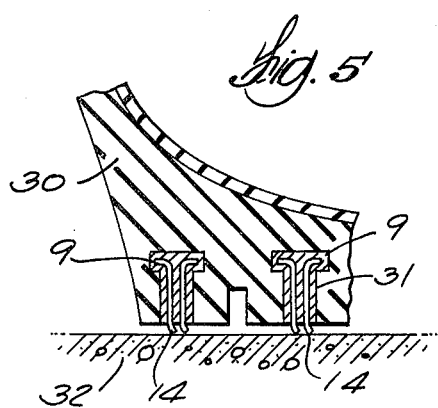
FIG. 5 is a partial cross-sectional view of a tire tread with the stud of FIG. 1 protruding against a concrete surface.

In FIG. 5 the tire tread 30 is shown on the concrete 32. A stud 9 is inserted in a hole 31 in the tread 30 with the tips 14 of the protruding wires flexed parallel to the concrete surface.

Figure 6:
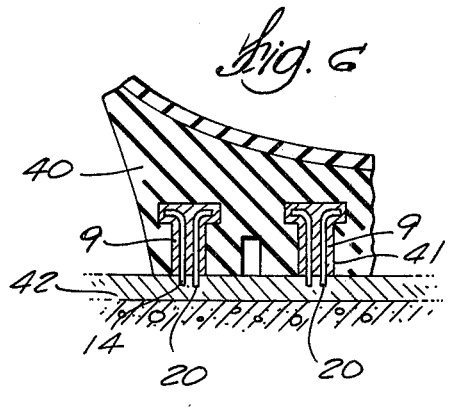
FIG. 6 is a partial cross-sectional view of a tire tread with the stud of FIG. 1 protruding against snow or ice.

In FIG. 6 the tire tread 40 is shown on a snow or ice surface 42. Stud 9 is inserted in the hole 41 in the tread 40 with the tips 14 of the protruding wires penetrating the snow or ice surface 42.

Variations of these embodiments can be made such as there can be any number of wires in the assembly, and the size of the wires can be varied, and stiffness and compositions of the wire and matrix materials can be varied.

While I have disclosed certain embodiments and details of the construction in describing my invention, various other changes and modifications may be made without departing from the meaning of the invention, and such changes and modifications are within the scope of the claims.

Having thus described my invention, what I claim as new and desire to protect by Letters Patent are the following:

1. An individual, discrete anti-skid stud for insertion into a hole in the surface of a resilient automotive tire comprising a generally cylindrical matrix body, a matrix base at the inside end of the matrix body, the matrix base having a larger diameter than the matrix body, at least two wires of a material of greater wear resistance than the material of the matrix body and base, said wires being embedded in the matrix body in parallel, portions of said wires extending outwardly from the end of the matrix body opposite the matrix base, retaining means on each of said wires; said retaining means extending outwardly in spaced radial direction into the matrix base beyond the diameter of the matrix body to securely embed the wires in the matrix body, each retaining means being an integral part of its associated wire and carried therefrom into said matrix base to define a generally L-shaped configuration.

2. An individual, discrete anti-skid stud for insertion into a hole in the surface of a resilient automotive tire comprising a generally cylindrical matrix body, a matrix base at the inside end of the matrix body, the matrix base having a larger diameter than the matrix body, at least two wires of a material of greater wear resistance than the material of the matrix body and base, said wires being embedded in the matrix body in parallel, portions of said wires extending outwardly from the end of the matrix body opposite the matrix base, retaining means on said wires extending radially outwardly into the matrix base securely embedding the wires in the matrix body wherein each pair of the wires is formed by bending into a U-shape to provide an end and the retaining means being a straight cross-member fitting into the end of the U and extending radially outwardly into the matrix base to retain each pair of the wires in place.

* * * * *